(12) United States Patent
Oi

(10) Patent No.: US 8,243,321 B2
(45) Date of Patent: Aug. 14, 2012

(54) DOCUMENT PROCESSING APPARATUS AND DOCUMENT PROCESSING METHOD

(75) Inventor: Hirokazu Oi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1284 days.

(21) Appl. No.: 11/937,144

(22) Filed: Nov. 8, 2007

(65) Prior Publication Data

US 2008/0123133 A1    May 29, 2008

(30) Foreign Application Priority Data

Nov. 10, 2006    (JP) ................................ 2006-305716

(51) Int. Cl.
    *G06K 15/00*    (2006.01)
    *G06F 17/24*    (2006.01)

(52) U.S. Cl. ..................... 358/1.18; 358/1.15; 358/1.17; 715/204; 715/251; 715/255; 715/274

(58) Field of Classification Search ................. 358/1.18, 358/1.15, 1.17; 715/204, 251, 255, 274
See application file for complete search history.

(56) References Cited

U.S. PATENT DOCUMENTS

2004/0066527 A1 * 4/2004 Kloosterman et al. ........ 358/1.15
2007/0195368 A1 * 8/2007 Waara ........................... 358/1.18

FOREIGN PATENT DOCUMENTS

| JP | 09-190374 | 7/1997 |
| JP | 2002-032363 | 1/2002 |
| JP | 2002-324062 | 11/2002 |

* cited by examiner

*Primary Examiner* — King Poon
*Assistant Examiner* — Lawrence Wills
(74) *Attorney, Agent, or Firm* — Carter, DeLuca, Farrell & Schmidt LLP

(57) ABSTRACT

A data acquisition unit that acquires data from a server, a generation unit that generates a first document that has been laid out by merging the data into a template that describes layout information, a rendering unit that renders the first document that has been laid out to obtain a document for output, and a document association unit that associates a document set, the first document that has been laid out and the document for output are comprised. The rendering unit renders a second document that has been laid out obtained by editing the first document that has been laid out to obtain a second document for output, and the document association unit associates the document set, the second document that has been laid out and the second document for output.

3 Claims, 15 Drawing Sheets

FIG. 4A

LAYOUT TEMPLATE

```
<?xml version="1.0" encoding="Shift_JIS"?>
<fo:root xmlns:fo="http://www.w3.org/1999/XSL/Format" language="ja" xmlns:mrg="http://www.xyz.com/merge/">
 <fo:layout-master-set>
  <fo:simple-page-master page-width="210mm" page-height="297mm"master-name="PageMaster">
   <fo:region-body margin-top="25mm" margin-right="10mm" margin-bottom="20mm" margin-left="10mm"/>
   <fo:region-before background-color="#EFEFEF" extent="20mm" display-align="center"/>
   <fo:region-after background-color="#EFEFEF" extent="20mm" display-align="center"/>
  </fo:simple-page-master>
 </fo:layout-master-set>
 <fo:page-sequence master-reference="PageMaster">
  <fo:static-content flow-name="xsl-region-before">
  </fo:static-content>
  <fo:flow flow-name="xsl-region-body">
   <fo:block absolute-position="absolute" left="2cm" top="5cm" font-size="18pt" font-family="MS-Gothic" line-height="24pt" space-after.optimum="15pt" background-color="blue" color="white" text-align="center" padding-top="3pt">CUSTOMER LIST A</fo:block>
   <fo:table absolute-position="absolute" left="2cm" top="7cm" line-height="10pt"
       text-align="center"
       table-layout="fixed"
       border-collapse="collapse"
        space-after.optimum="0.7cm" width="100%">
    <fo:table-column column-number="1" column-width="42pt"/>
    <fo:table-column column-number="2" column-width="28pt"/>
    <fo:table-column column-number="3" column-width="21pt"/>
    <fo:table-column column-number="4" column-width="21pt"/>
    <fo:table-column column-number="5" column-width="28pt"/>
    <fo:table-column column-number="6" column-width="21pt"/>
    <fo:table-column column-number="7" column-width="28pt"/>
    <fo:table-body><fo:table-row background-color="gray">
```

FIG. 4B

```
<fo:table-cell number-columns-spanned="1" padding="2pt" border-style="solid" border-width="1pt" display-align="center">
<fo:block font-family="MS-Gothic" font-size="9pt" text-align="center">NAME</fo:block>
</fo:table-cell>
<fo:table-cell number-columns-spanned="1" padding="2pt" border-style="solid" border-width="1pt" display-align="center">
<fo:block font-family="MS-Gothic" font-size="9pt" text-align="center">ADDRESS</fo:block>
</fo:table-cell>
<fo:table-cell number-columns-spanned="1" padding="2pt" border-style="solid" border-width="1pt" display-align="center">
<fo:block font-family="MS-Gothic" font-size="9pt" text-align="center">TELEPHONE NO.</fo:block>
</fo:table-cell>
<fo:table-cell number-columns-spanned="1" padding="2pt" border-style="solid" border-width="1pt" display-align="center">
<fo:block font-family="MS-Gothic" font-size="9pt" text-align="center">PRODUCT PURCHASED</fo:block>
</fo:table-cell>
<fo:table-cell number-columns-spanned="1" padding="2pt" border-style="solid" border-width="1pt" display-align="center">
<fo:block font-family="MS-Gothic" font-size="9pt" text-align="center">DATE PURCHASED</fo:block>
</fo:table-cell>
</fo:table-row>

<mrg:foreach index="$i" list="CUSTOMER LIST">   ～901
<fo:table-row>
<fo:table-cell number-columns-spanned="1" padding="2pt" border-style="solid" border-width="0.1pt">
<fo:block font-family="MS-Gothic" font-size="9pt" text-align="center"><mrg:value name="CUSTOMER LIST[$i].NAME"/></fo:block>
</fo:table-cell>
<fo:table-cell number-columns-spanned="1" padding="2pt" border-style="solid" border-width="0.1pt">
<fo:block font-family="MS-Gothic" font-size="9pt" text-align="center"><mrg:value name="CUSTOMER LIST [$i].ADDRESS"/></fo:block>
                                                                                 902
<fo:table-cell number-columns-spanned="1" padding="2pt" border-style="solid" border-width="0.1pt">
<fo:block font-family="MS-Gothic" font-size="9pt" text-align="center"><mrg:value name="CUSTOMER LIST [$i].TELEPHONE NO."/></fo:block>
```

FIG. 4C

```
<fo:table-cell number-columns-spanned="1" padding="2pt" border-style="solid" border-width="0.1pt">
<fo:block font-family="MS-Gothic" font-size="9pt" text-align="center"><mrg:value name="CUSTOMER LIST [$i].PRODUCT PURCHASED"/></fo:block>
</fo:table-cell>
<fo:table-cell number-columns-spanned="1" padding="2pt" border-style="solid" border-width="0.1pt">
<fo:block font-family="MS-Gothic" font-size="9pt" text-align="center"><mrg:value name="CUSTOMER LIST [$i].DATE PURCHASED"/></fo:block>
</fo:table-cell>
</fo:table-row>
</mrg:foreach>
</fo:table-body>
</fo:table>
</fo:flow>
</fo:page-sequence>
</fo:root>
```

FIG. 6

DOCUMENT THAT HAS BEEN LAID OUT

```
<?xml version="1.0" encoding="Shift_JIS"?>
<fo:root xmlns:fo="http://www.w3.org/1999/XSL/Format" language="ja" xmlns:mrg="http://www.xyz.com/merge/"
xmlns:Layout="http://xyz.com.Layout">

<Layout:created-date>2006-01 10:10</Layout:created-date>    ~801

<Layout:authorization-data id="1">    ~802
    <Layout:type>seal</Layout:type>    ~803
    <Layout:data-type>image</Layout:data-type>    ~804
    <Layout:data>GREAT SEAL IMAGE DATA</Layout:data>    ~805
</Layout:authorization-data>

<Layout:update-request>true</Layout:update-request>    ~806
<Layout:print-request>true</Layout:print-request>    ~807
<Layout:auto-return-request>    ~808
    <Layout:return-host>pc1.xyz.com</Layout:return-host>    ~809
</Layout:auto-return-request>
<Layout:notified-host>pc2.xyz.com</Layout:notified-host>    ~810
<Layout:destination-host>pc1.xyz.com</Layout:destination-host>    ~811

<fo:layout-master-set>
...
HEREINAFTER THE DOCUMENT FOLLOWS THE FORMAT SHOWN IN FIG. 4
</fo:root>
```

110

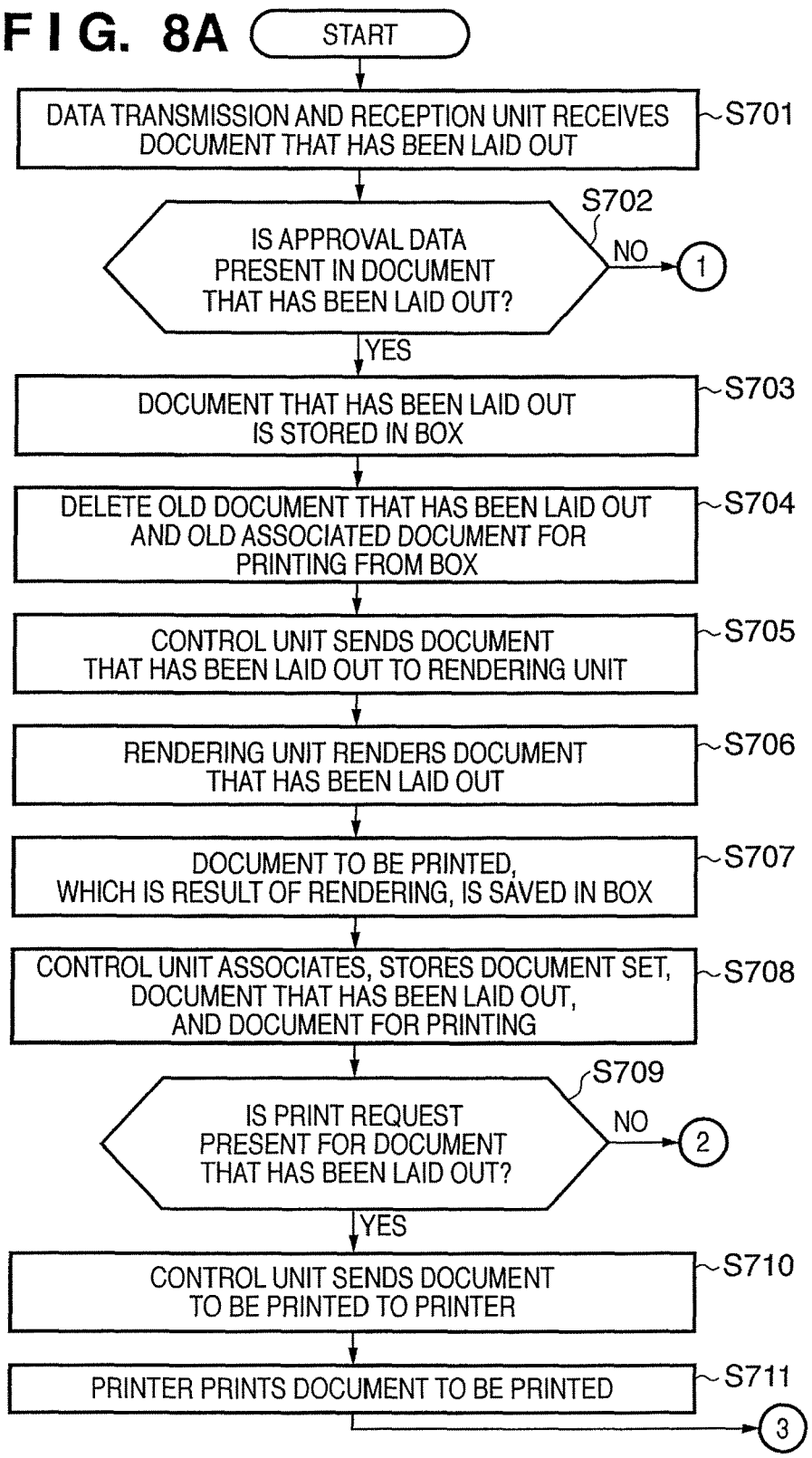

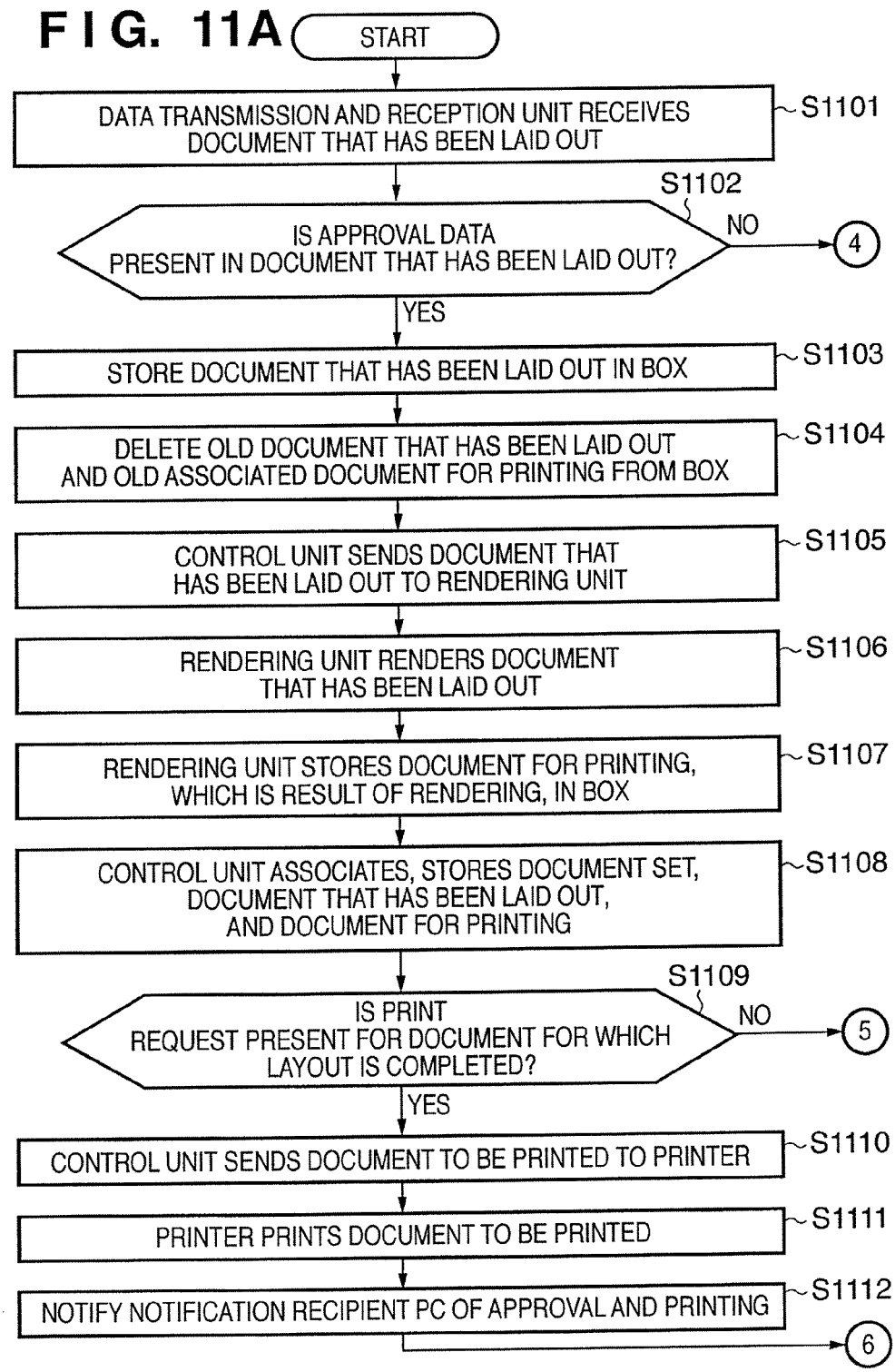

DOCUMENT PROCESSING APPARATUS AND DOCUMENT PROCESSING METHOD

BACKGROUND OF THE INVENTION

1. Field of the Invention

The present invention relates to a document processing apparatus and a document processing method in an output apparatus.

2. Description of the Related Art

Conventionally, there exists a technology for processing a document that relates to a document transferred between one image processing apparatus and another image processing apparatus, by sending a document list that relates to the transferred document; see, for example, Japanese Patent Laid-Open No. 09-190374.

A technology exists that links an original document with a document for use in a viewer, and makes a record thereof; see, for example, Japanese Patent Laid-Open No. 2002-324062.

A technology exists that automatically selects a data of an appropriate document format when a data in a plurality of document formats is recorded in a single document, in accordance with information of such as a user manipulating the document; see, for example, Japanese Patent Laid-Open No. 2002-32363.

Under the conventional technology, however, a method of relating one document to another document is rigid, being based on a content of the document. Nor does the technology take into consideration a circumstance wherein the document is itself generated dynamically. Nor is a data for use in outputting updated when the document is edited.

SUMMARY OF THE INVENTION

The present invention was designed with the problems in mind, and has an objective of facilitating generating a data for use in outputting in accordance with an edit of a document that has been laid out, or for a content of an edited document that has been laid out, with regard to an apparatus that dynamically generates the document that has been laid out.

According to one aspect of the present invention, there is provided a document processing apparatus, comprising: a data acquisition unit adapted to acquire data from a server, based on data acquisition instruction information read out from a document set including a template that describes layout information and the data acquisition instruction information that describes the data to be acquired from the server; a generation unit adapted to merge the data acquired by the data acquisition unit into the template to generate a first document that has been laid out; an edit unit adapted to edit the first document that has been laid out to obtain a second document that has been laid out; a rendering unit adapted to render the first and second documents that have been laid out to obtain first and second documents for output; and a document association unit adapted to associate the document set, the first document that has been laid out and the first document for output, and associate the document set, the second document that has been laid out and the second document for output.

According to another aspect of the present invention, there is provided a document processing method adapted to an output apparatus, comprising: acquiring data from a server, based on data acquisition instruction information read out from a document set including a template that describes layout information and the data acquisition instruction information that describes the data to be acquired from the server; merging the data acquired in the acquiring step into the template to obtain a first document that has been laid out; first rendering the first document that has been laid out to obtain a first document for output; first associating the document set, the first document that has been laid out and the first document for output; editing the first document that has been laid out to obtain a second document that has been laid out; second rendering the second document that has been laid out to obtain a second document for output; and second associating the document set, the second document that has been laid out and the second document for output.

Further features of the present invention will become apparent from the following description of exemplary embodiments with reference to the attached drawings.

BRIEF DESCRIPTION OF THE DRAWINGS

FIGS. 4A to 4C depict a layout template 900 for embedding a customer list data obtained from an ASP server 102.

FIG. 6 depicts an example of a document that has been laid out 110, which is a result of merging the layout template 900, which is tagged in XSL-FO, and an acquired data list 330.

FIGS. 8A and 8B are flowcharts depicting an example of a process of receiving the document that has been laid out of the MFP 101.

FIGS. 11A and 11B are flowcharts depicting an example of a process of receiving the document that has been laid out 110 of the MFP 101.

DESCRIPTION OF THE EMBODIMENTS

First Embodiment

Figure 1:
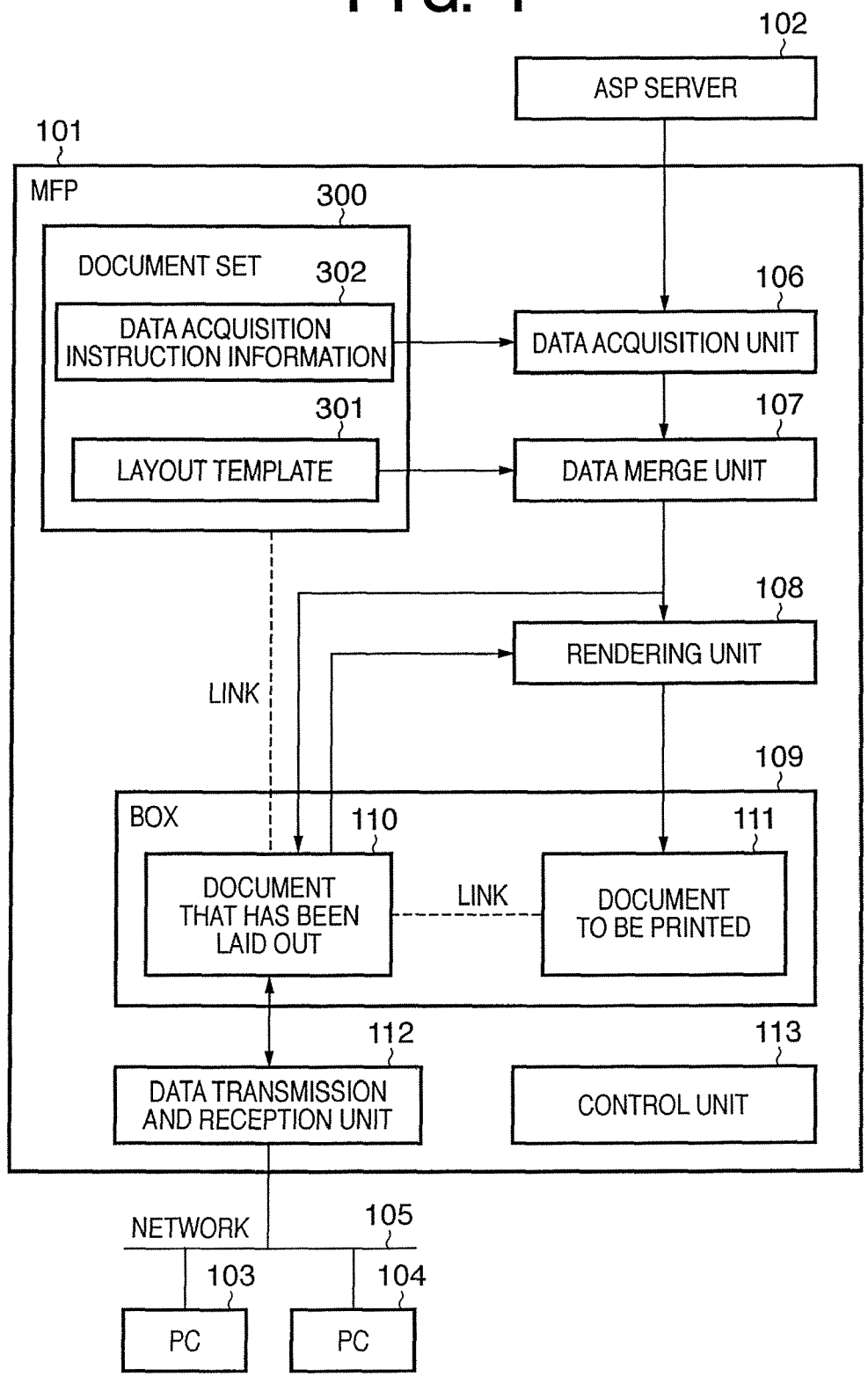
FIG. 1 is a block diagram depicting a configuration of an image output system.

Following is a description of a first embodiment, with reference to FIGS. 1-8. FIG. 1 is a block diagram depicting a configuration of an image output system.

Reference numeral 101 in FIG. 1 is a multi-function peripheral (MFP), which is an image output apparatus. Reference numeral 102 is a server whereupon an application service provider (ASP) provides a service (hereinafter "ASP server"). Reference numeral 103 is a personal computer (PC), which is a computer apparatus. Reference numeral 104 is a personal computer (PC), which is a computer apparatus. Reference numeral 105 is a network, which connects such devices as the MFP 101 and the PC 103. While it would be permissible for the ASP server 102 to be connected to the network 105, the ASP server 102 is not connected to the network 105 in FIG. 1 for purposes of clarifying a data flow therein.

The MFP 101 comprises the following components: reference numeral 106 is a data acquisition unit, for obtaining a data from the ASP server 102. Reference numeral 107 is a data merge unit, which merges the data that the data acquisition unit 106 acquires with a layout template 301 contained within a document set 300. The data merge unit 107 inserts, or embeds, the data that the data acquisition unit 106 acquires into the layout template 301 contained within the document set 300. The document set 300, the layout template 301, and data acquisition instruction information 302, will be described hereinafter.

Reference numeral 108 is a rendering unit for rendering data that is a result of the merge. Reference numeral 109 is a box for saving document data that is an output result of the data merge unit 107 or the rendering unit 108. Reference numeral 110 is a document that has been laid out, which is an output result of the data merge unit, and is stored in the box 109. Reference numeral 111 is a document for printing, that is, a document for image outputting, which is an output result of the rendering unit 108, and is stored in the box 109. Reference numeral 112 is a data transmission and reception unit for transmitting and receiving the document that has been laid out 110 outside the MFP 101, via the network 105. Reference numeral 113 is a control unit that controls a component other than a component that controls each respective component within the MFP 101.

Figure 2:
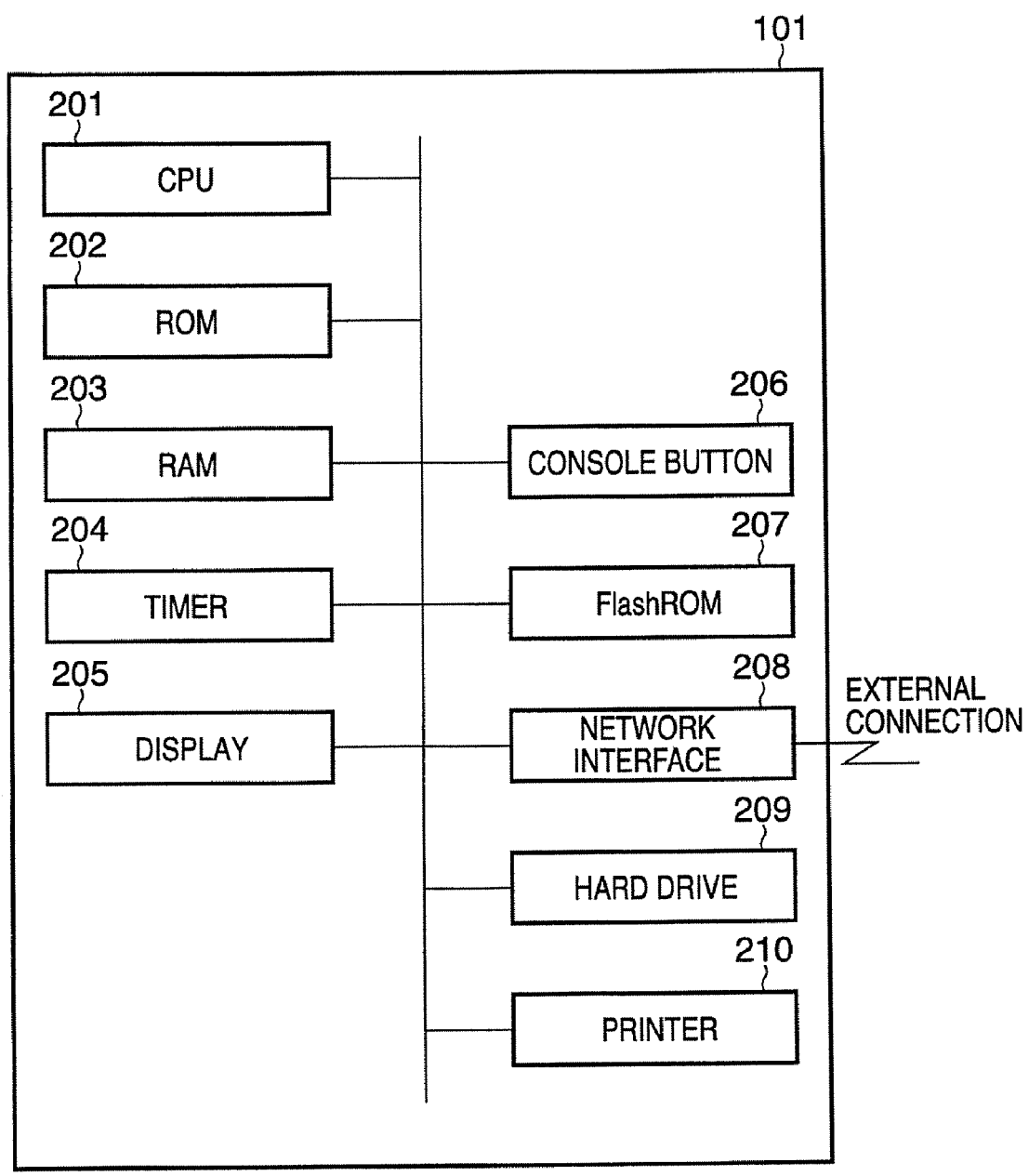
FIG. 2 is a block diagram depicting an internal configuration as seen from a hardware aspect of an MFP 101.

FIG. 2 is a block diagram depicting an internal configuration as seen from a hardware aspect of the MFP 101. In FIG. 2, the MFP 101 comprises a central processing unit (CPU) 201 that controls the overall apparatus, a ROM 202 that stores each type of operating program in a readable manner, and a RAM 203 used to temporarily save a value while a program is in operation. The MFP 101 also comprises a display 205 for displaying a user interface, a various types of console buttons 206, and a flash ROM 207 that is a nonvolatile memory for storing each type of setting data file. The MFP 101 also comprises a network interface 208 for connecting to an external apparatus, a hard drive 209 for storing each type of operation program and each type of setting data file, and a printer 210.

The CPU 201 implements the data acquisition unit 106, the data merge unit 107, the rendering unit 108, the data transmission and reception unit 112, and the control unit 113, by executing a program stored in ROM 202.

FIG. 2 depicts the internal configuration of the MFP 101, and the configuration elements such as are depicted in FIG. 2 may also be seen within a typical computer. Although the ASP server 102, the PC 103, and the PC 104 may also possess the configuration elements that characterize each respective apparatus, or may not possess some of the elements thereof, the apparatuses similarly comprise the configuration elements such as are depicted in FIG. 2. Given the similarities therebetween, a drawing depicting an internal configuration of each respective apparatus will be omitted.

Figure 3:
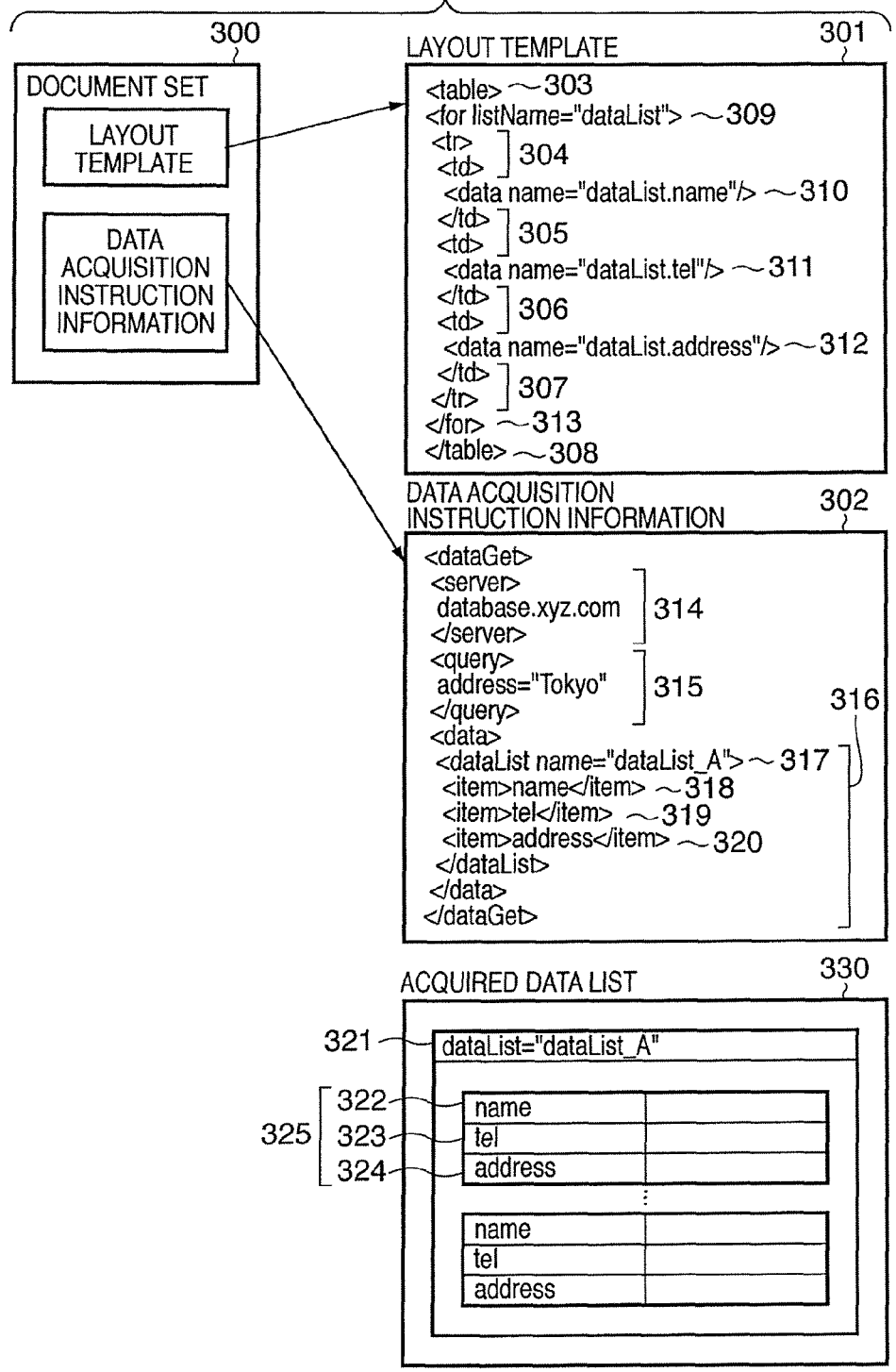
FIG. 3 describes a document set.

FIG. 3 describes a document set. The document set 300 is configured of the layout template 301 and the data acquisition instruction information 302. The data acquisition instruction information 302 comprises hostname information 314 of an ASP server 102, a search condition 315 when searching for the data on the ASP server 102, and an item list 316 that defines a data item to be acquired.

The data acquisition instruction information 302 instructs to search for data with an address item of "Tokyo" (315) within a "dataList_A" (317) within the ASP server 102, which has a hostname (314) of "database.xyz.com" and acquire a name item (318), a telephone number item (319), and an address item (320).

When the data that satisfies the search condition is found on the ASP server 102, the ASP server 102 returns the data that satisfies the search condition to the MFP 101, in a SOAP message format. A data acquisition list 330 denotes a format of the data that the MFP 101 receives at such a time. It is possible that a plurality of the data that satisfies the search condition may be present on the ASP server 102. Accordingly, the data that is actually acquired is a list that comprises a plurality of a data set 325, with a name element 322, a telephone number element 323, and an address element 324, as depicted in the data acquisition list 330.

The data acquisition instruction information 302 is tagged and structured in an XML format. According to the embodiment, the ASP server 102 supports Web Services, and it is possible to access the data on the ASP server 102 by sending a SOAP message from the MFP 101. The data acquisition instruction information 302 is tagged in the XML format in order to make the SOAP message easy to assemble. While it is permissible for the data acquisition instruction information 302 to be tagged in a markup format other than the XML format, it is particularly desirable that the data is structured.

The layout template 301 is configured of format information 303-308, and data merge information 309-313. The data merge information denotes how the acquired data is to be merged. The data set 325 contained in the dataList 321 is extracted one at a time from the data acquisition list 330 that is the data acquired from the ASP server 102. The name element 322 is embedded in data merge information 310, the telephone number element 323 is embedded in data merge information 311, and the address element 324 is embedded in data merge information 312. The MFP 101 repeats the process throughout the entire dataList 321, using a "for" tag in the data merge information 309 and 313.

While the format information 303-308 contained within the layout template 301 is tagged in HyperText Markup Language (HTML), the embodiment is not restricted thereto.

FIGS. 4A to 4C depict another example of the layout template 301. FIGS. 4A to 4C depict a layout template 900 for embedding a customer list data that is obtained from the ASP server 102. The layout template 900 is tagged with layout information in Extensible Stylesheet Language-Formatting Objects, or XSL-FO. Format information with regard to the layout template 900 is an element specified in a name space "mrg."

A "foreach" element 901 and a "value" element 902 are used in the present circumstance. The "foreach" element denotes repeatedly processing a content component of the "foreach" element for as much iteration as the number of the list that a "list" attribute denotes. It is possible to specify an index for classifying each respective data of the list, that is, each respective customer record with regard to a customer list, and the index is tagged with an attribute value of "index." The "value" element denotes that a data that is pointed by a "name" attribute is located in a position of the "value" element. A "name" attribute value is capable of employing the "index" attribute value, which allows the data merge process to classify the customer record and embed a data of an appropriate customer record item within the layout template 900.

Figure 5:
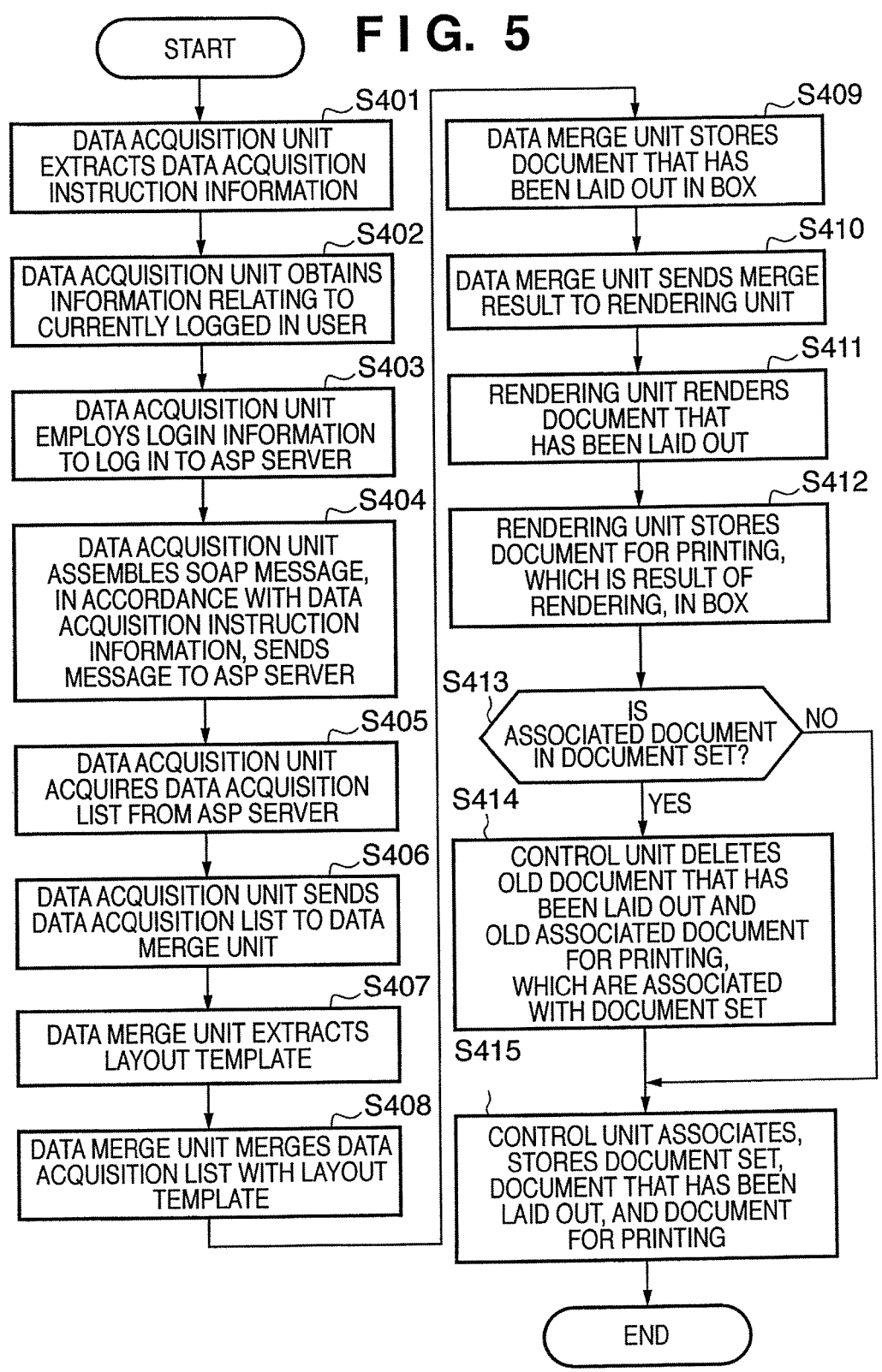
FIG. 5 is a flowchart depicting an example of a data acquisition process of the MFP 101.

The following is a description of an operation of an image output apparatus according to the embodiment, with reference to a flowchart. FIG. 5 is a flowchart depicting an example of a data acquisition process of the MFP 101.

In FIG. 5, the process begins with selecting the document set 300 that corresponds to the data to be acquired, by a user executing a prescribed operation when logging in to the MFP 101. Following the selection, the user uses the prescribed operation to instigate the data acquisition process (the user operation sequence is not shown).

In step S401, the instigation of the data acquisition process causes the data acquisition unit 106 to extract the data acquisition instruction information 302 from within the document set 300.

In step S402, the data acquisition unit 106 obtains information relating to a user that is currently logged in, for example, a login ID and a password.

In step S403, the data acquisition unit 106 employs login information, for example, the login ID and the password, to log in to the ASP server 102.

In step S404, after logging in, the data acquisition unit 106 assembles the SOAP message, in accordance with the data acquisition instruction information 302, and sends the message to the ASP server 102.

Upon receipt, the ASP server 102 analyzes the SOAP message, and returns the requested data to the MFP 101 as the data acquisition list 330 (not shown). In step S405, the data acquisition unit 106 acquires the data acquisition list 330 from the ASP server 102.

In step S406, the data acquisition unit 106 sends the data acquisition list 330 to the data merge unit 107.

In step S407, the data merge unit 107 extracts the layout template 301.

In step S408, the data merge unit 107 merges the data acquisition list 330 with the layout template 301. The document that has been laid out 110 is obtained as a result of the merge. As with the layout template, the document that has been laid out 110 is tagged in HTML or XSL-FO.

An example of the document that has been laid out 110 is depicted in FIG. 6. FIG. 6 depicts an example of the document that has been laid out 110, which is a result of merging the layout template 900, which is tagged in XSL-FO, and the acquired data list 330.

The data of the acquired data list 330 is deployed in the layout template 900 starting below a <fo:layout-master-set> tag, and is the unaltered result of the merge. While a component appearing before the tag is not present in the layout template 900, each type of tag and data that is added when the document that has been laid out 110 is created is present therein. In the example depicted in FIG. 6, the appended tag and data type is identified by a "Layout" name space. For example, in FIG. 5, step S408, an information that denotes a date that the document that has been laid out 110 is created is embedded in a <Layout:create-date> tag 801. The tag of the "Layout" name space is not appended solely when the document that has been laid out 110 is created. Another process of appending the tag will be described hereinafter.

In step S409, the data merge unit 107 stores the document that has been laid out 110, which is the result of the merge, in the box 109.

In step S410, the data merge unit 107 sends the document that has been laid out 110 to the rendering unit 108.

In step S411, the rendering unit 108 renders the document that has been laid out 110 for a printing application. The document for printing 111 is obtained as a result of the rendering thereof.

Page Description Language (PDL) or Portable Document Format (PDF) may be cited as an example of a description format of the document for printing 111. Such formats are distinguished by strong interoperability with different types of hardware, owing to being either de facto or official standards, while also making it difficult to add unique functionality.

Returning to the description in FIG. 5, in step S412, the rendering unit 108 stores the document for printing 111, which is the result of the rendering, in the box 109.

In step S413, the control unit 113 checks whether or not either the document that has been laid out 110 or the document for printing 111 is present that is associated with the document set 300 by referring to an association table. Association refers to the control unit 113 associating the document set 300, and the document that has been laid out 110, and the document for printing 111 that is created in accordance therewith, and storing the association thereof in the association table (not shown) in the RAM 203.

In step S414, the control unit 113 deletes the associated document that has been laid out 110 and the associated document for printing 111 from the box 109, if such a document is present. The presence of the document prior to the association of the documents generated in steps S409 and S412 in the association table refers to a presence of an old document associated during a previous execution of the data acquisition process. The old document is unnecessary and deleted at the present time when the new document is generated. The old document may be distinguished from the new document and be left.

If neither the associated document that has been laid out 110 nor the associated document for printing 111 is present, step S414 is skipped.

Finally, in step S415, the control unit 113 associates the document set 300, and the document that has been laid out 110 and the document for printing 111 that is created in accordance therewith, and stores the association in the association table in the RAM 203. A plurality of the document set 300 is present within the MFP 101, and a plurality of instances of the association information of the document set 300, and the document that has been laid out 110 and the document for printing 111 that is created in accordance therewith, is stored in the association table.

If the user re-instigates the data acquisition process, the MFP 101 executes another iteration of the process, that is, the flowchart, depicted in FIG. 5, and the document that has been laid out 110 and the document for printing 111 are generated anew. In such a circumstance, the old document that has been laid out 110 and the old document for printing 111 are removed from the box, and the document set 300, the newly generated document that has been laid out 110, and the newly generated document for printing 111, are associated and stored.

The user is able to use a prescribed console operation to print the document for printing 111. In such a circumstance, the control unit 113 sends a selected document for printing 111 to the printer 210, which prints the document for printing 111.

Following is a description of a process of transmitting the document that has been laid out 110 of the MFP 101 to the PC 103.

Using a prescribed console operation, the user selects the document that has been laid out to attempt to transmit from the box 109, and the PC 103 that is the recipient thereof, and performs the transmission, whereupon the data transmission and reception unit 112 transmits the document that has been laid out 110 to the PC 103.

Figure 7:
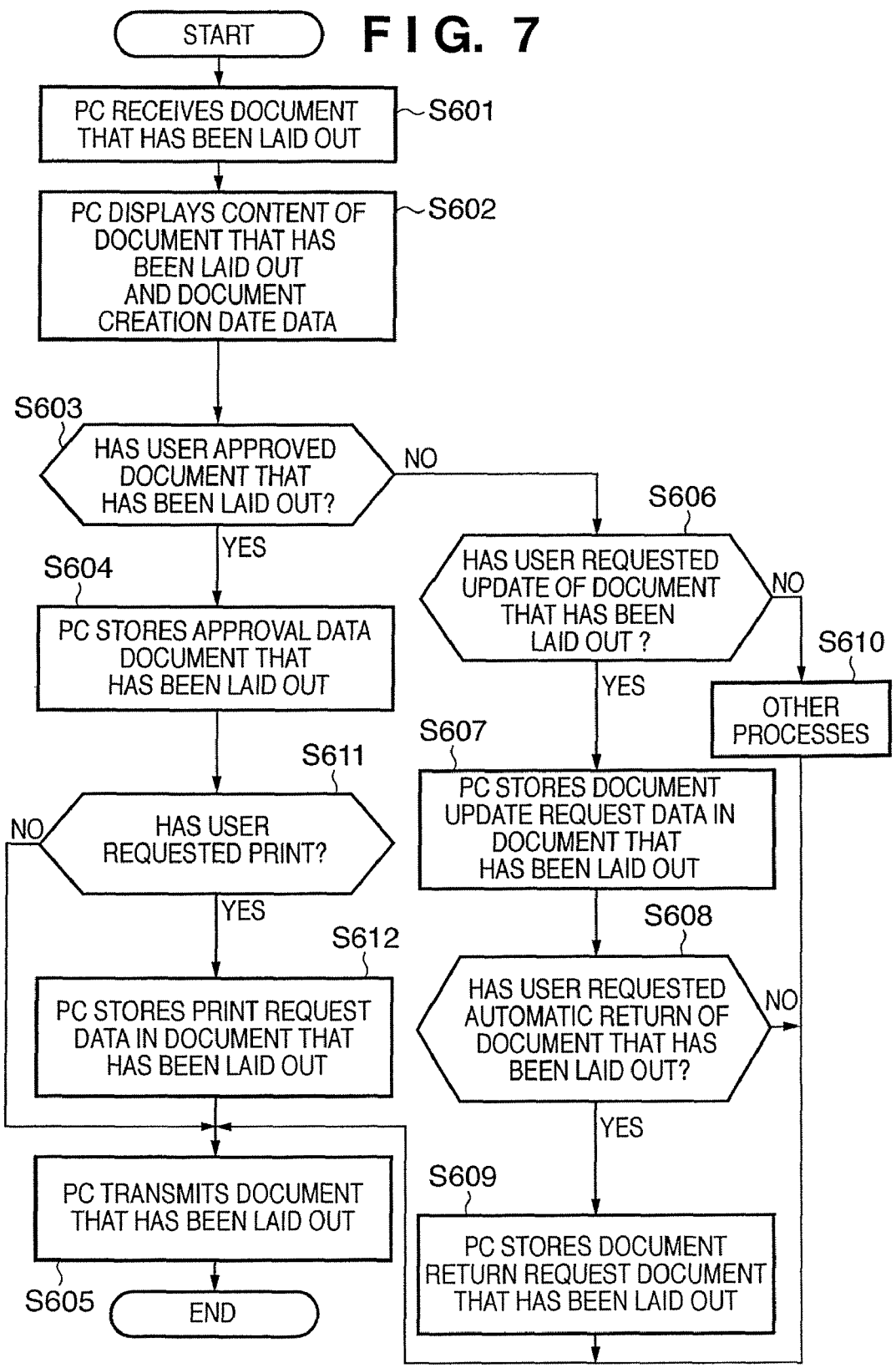
FIG. 7 is a flowchart depicting an example of a document process of a PC 103.

Following is a description of an example of a document process wherein the PC 103 processes the document that the MFP 101 transmits thereto, with reference to the flowchart in FIG. 7. FIG. 7 is a flowchart depicting the example of the document process of the PC 103.

In step S601, the PC 103 receives the document that has been laid out 110 from the MFP 101.

In step S602, the PC 103 employs a display unit (not shown) to display to the user a content of the document that has been laid out 110 thus received, as well as the data of the date of the creation of the document (801). In such a circumstance, the content of the document that has been laid out 110 is rendered, using a unit, that is, a function, similar to the rendering unit 108, so as to allow display thereof in a display format that is appropriate to the display unit of the PC 103, and displayed thereupon.

The user verifies the content and the data of the date of the creation of the document thus displayed, and determines whether or not to approve the document. If the user approves the document, the user performs a console operation for the approval thereof.

If the user performs the approval console operation, the PC 103 determines that a determination process in step S603 is "YES." In step S604, the PC 103 stores an approval data in the document that has been laid out 110.

The approval data may take a wide range of formats. It would be permissible for the approval data to be a seal of approval data, a digital signature data, or a combination thereof.

In the example depicted in FIG. 6, the approval data is stored in a location 802. If no <Layout:authorization-data> tag is present in such a circumstance, the PC 103 creates the tag in the present step.

An attribute "id" denotes the document element to which the approval data is associated. Assume, for example, that an approval field is made in the document that has been laid out 110, wherein the seal of approval is to be stamped. If the seal of approval data is to be displayed in the approval field by the approval console operation on the PC 103, the document element that denotes the approval field is associated with the approval data. In such a circumstance, the attribute "id" is chosen such that the document element, the approval data, and the attribute "id" match. As a particular operation, upon selecting a given approval field and performing the approval console operation such that the seal of approval is stamped therein, the attribute "id" of the document element that points to the approval field is used as an attribute of the <Layout: authorization-data> tag.

Reference numeral 803 denotes a type of the approval data. In the example in FIG. 6, the type is "seal of approval." Reference numeral 804 denotes a data type of the approval data. In the example in FIG. 6, the data type is "image." The data type is denoted as being an image data of the seal of approval. Reference numeral 805 denotes a data per se. In the example in FIG. 6, the image data of the seal of approval per se is stored. If the data is a binary data, the data is encoded in a text format or otherwise processed, and stored thereafter.

After the approval data is stored in the document, in step S611, the PC 103 determines whether or not the user has requested a print. If the user has performed a prescribed console operation that requests the print, the PC 103 presumes that the request thereof has been made.

If it is determines that the user has requested the print, that is, step S611 is "YES," in step S612, a print request data is stored in the document that has been laid out 110. In the example in FIG. 6, the print request data is stored in a reference numeral 807. If the print request is made, a value of "true" is stored in a <Layout:print-request> tag. If no such tag is present, the PC 103 creates the tag in the present step.

If the user has not requested the print, the process skips step S612. In step S605, the PC 103 transmits the document that has been laid out 110 to the MFP 101, and the process depicted in FIG. 7 ends.

If the user does not approve the document that has been laid out 110 in step S603, whether because the document creation date is old or for another reason, a request for updating the document that has been laid out 110 may be made.

If the user performs a console operation of a document update request, that is, step S603 is "NO" and step S606 is "YES," the process proceeds to step S607, wherein the PC 103 stores a document update request data in the document that has been laid out 110. In the example in FIG. 6, the document update request data is stored in a reference numeral 806. If the document update request is made, a value of "true" is stored in a <Layout:update-request> tag. If no such tag is present, the PC 103 creates the tag in the present step.

In step S608, the PC 103 determines whether or not the user has requested that the document that has been laid out 110 is automatically returned anew. If the user has performed a console operation that requests that the document that has been laid out 110 is automatically returned anew, that is, step S608 is "YES," the process proceeds to step 609, wherein the PC 103 stores an automatic document return request data in the document that has been laid out 110. In the example in FIG. 6, the automatic document return request data is stored in a reference numeral 808. If the automatic document return request is made, an information of a host to which the document is received is stored as a content of a <Layout:return-host> tag in a <Layout:auto-return-request> tag. A hostname of the PC 103, "pc1.xyz.com," is stored in the example depicted in FIG. 6. If such tags are not present, the PC 103 creates the tags in the present step.

If the user has not made the automatic return request, the process skips step S609.

Thereafter, in step S605, the PC 103 transmits the document that has been laid out 110 to the MFP 101, and the process depicted in FIG. 7 ends.

If the user does not request the update of the document that has been laid out 110, that is, step S606 is "NO," in step S610 the PC 103 performs another process of inserting each respective type of tag in response to a console operation that the user performs.

Figure 8B:
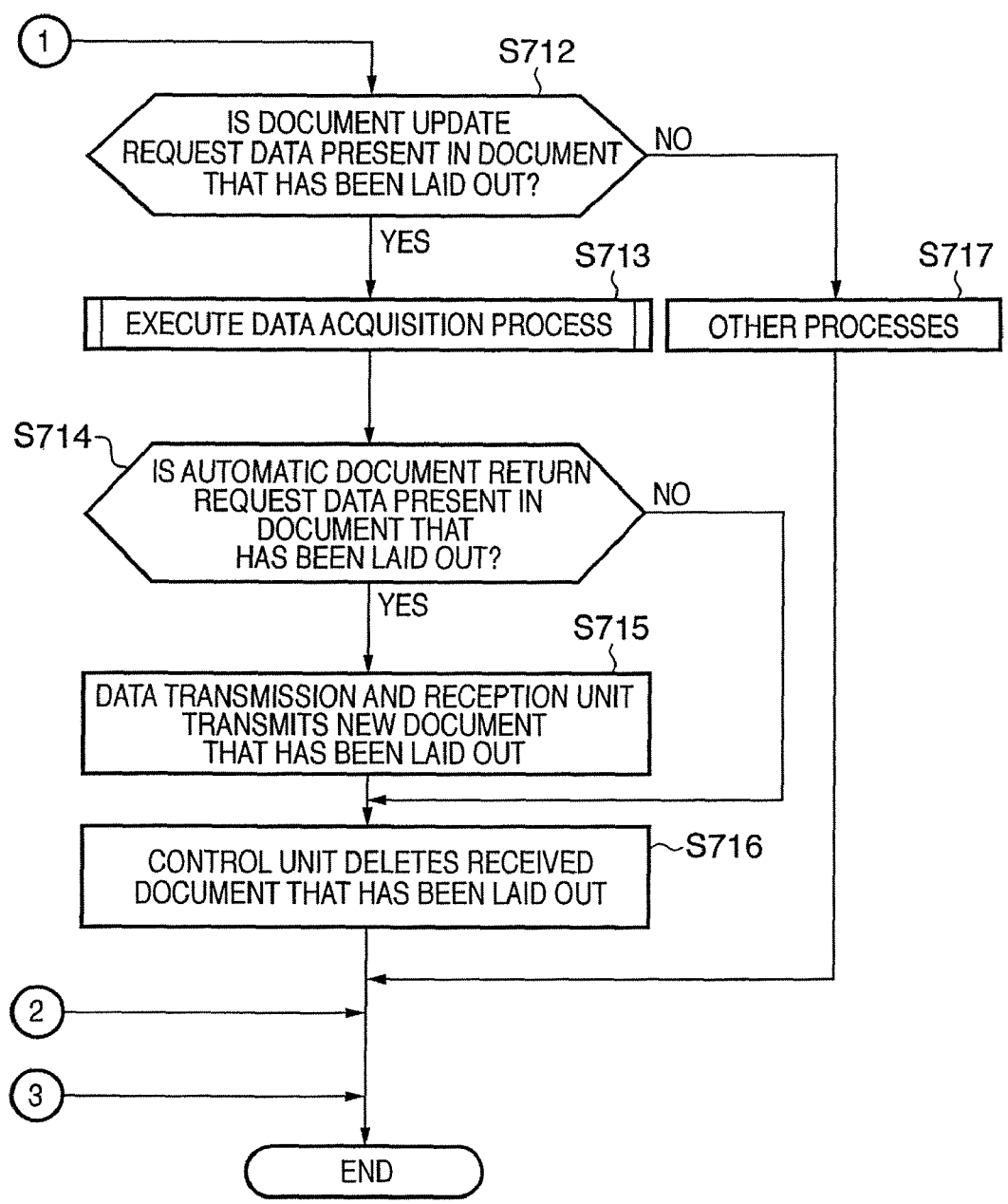

Following is a description of a process of the MFP 101 receiving the document that has been laid out 110 from the PC 103, with reference to the flowcharts depicted in FIGS. 8A and 8B. FIGS. 8A and 8B are flowcharts depicting an example of the process of receiving the document that has been laid out of the MFP 101.

In step S701, the data transmission and reception unit 112 receives the document that has been laid out 110.

In step S702, the control unit 13 analyzes the content of the received document that has been laid out 110, and checks whether the approval data 802 is present in the received document that has been laid out 110.

If the approval data 802 is present, in step S703, the document that has been laid out 110 is stored in the box 109.

In step S704, the control unit 113 deletes an original data of the received document that has been laid out 110, that is, the old document that has been laid out 110 without the approval data 802, and the document for printing 111 that is associated therewith, from the box 109. It would be permissible to append an identifier to the document that has been laid out 110 in advance for purposes of searching for the original data (not shown). It would be permissible for the identifier to be appended by a method that is capable of identifying the document that has been laid out 110 from without, for example, appending an identifiable name thereto, or a method that embeds an identifying information within the document that has been laid out 110, for example, creating a special tag and embedding an identifying ID therein. The control unit 113 searches within the association table to perform a search for the associated document for printing 111.

In step S705, the control unit 113 sends the received document that has been laid out 110 to the rendering unit 108.

In step S706, the rendering unit 108 renders the document that has been laid out 110. In such a circumstance, the rendering unit 108 recognizes the attribute "id" within the approval data 802, identifies an approval field that matches the "id," and performs the rendering such that the image data of the seal of approval within the approval data 802 is rendered within the approval field.

In step S707, the control unit 113 receives, and stores in the box 109, the document for printing 111 that is the result of the rendering.

An examination of the association table reveals the document set 300 associated with the old document that has been laid out 110. In step S708, the control unit 113 associates and stores the document set 300, the document that has been laid out 110, and the document for printing 111 in the association table.

In step S709, the control unit 113 determines whether or not a request has been made for printing the document that has been laid out 110. The control unit 113 performs the determination based on whether or not the print request data 807 is present within the document that has been laid out 110.

If the request for printing has been made, in step S710, the control unit 113 sends the document for printing 111 that is associated with the document that has been laid out 110 to the printer 210. In step S711, the printer 210 prints the document for printing 111, and the process depicted in FIGS. 8A and 8B ends.

If the request for printing has not been made, the process skips steps S710 and S711.

If it is determined in step S702 that the approval data 802 is not present, that is, step S702 is "NO," in step S712, the control unit 113 checks whether or not the document update request data 806 is present within the document that has been laid out 110.

If the document update request data 806 is present, in step S713, the MFP 101 executes the data acquisition process depicted in FIG. 5. The MFP 101 executes the data acquisition process in accordance with the document set 300 that is associated with the old document that has been laid out 110 that is the original data of the received document that has been laid out 110, within the association table.

In such a circumstance, the document that has been laid out 110 and the document for printing 111 are generated anew. The received document that has been laid out is treated as 110a, the old document that has been laid out being the original data thereof is treated as 110b, and the document for printing that is associated with the document that has been laid out 110b is treated as 111b. The newly generated document that has been laid out is treated as 110c, and the document for printing that is generated in accordance therewith is treated as 111c.

In step S413 of the data acquisition process that is executed, or called, in step S713, the control unit 113 determines that the document that has been laid out 110b and the document for printing 111b, which are associated with the document set 300, are present.

In step S414, the control unit 113 deletes the document that has been laid out 110b and the document for printing 111b. In step S414, the control unit 113 associates the document set 300, the document that has been laid out 110c, and the document for printing 111c.

Returning to the description in FIG. 8B, in step S714, the control unit 113 checks whether or not the automatic document return request data 808 is present in the received document that has been laid out 110a.

If the automatic document return request data 808 is present, in step S715, the data transmission and reception unit 112 transmits the new document that has been laid out 110c to the PC 103, which is a receiver that a receiver host 809 within the automatic document return request data 808 denotes.

In step S716, the control unit 113 deletes the no longer needed document that has been laid out 110a, and the process depicted in FIGS. 8A and 8B ends. It would be possible to store the received document that has been laid out that has been laid out 110 on the hard drive 209, rather than in the box 109. In such a circumstance, the control unit 113 deletes the received document that has been laid out 110 from the hard drive 209. If the received document that has been laid out 110 is stored in the RAM 203, the control unit 113 deletes the received document that has been laid out 110 from the RAM 203.

If the document update request data 806 is not present in the received document that has been laid out 110a, in step S717, the control unit 113 checks whether or not another tag is present, and performs another process in response to the tag that is present.

It is possible for the document that has been laid out 110 transmitted to the PC 103 in step S715 to be re-processed according to the flowchart depicted in FIG. 7. A repeating process is thus possible, allowing the user to reissue the update request and the automatic document return request if he is unsatisfied with the document automatically returned. It goes without saying that the user may also approve the document that has been laid out automatically returned, and request printing thereof, if he is satisfied therewith.

If the user issues the approval and the print request to the PC 103 simultaneously, it is possible to have the rendering process performed in a format that includes such as the approval data, and printed as is. Accordingly, it is possible to implement a smoother, less complicated workflow, as compared with a process of operating the MFP 101 and printing anew after issuing the approval.

Second Embodiment

Figure 9:
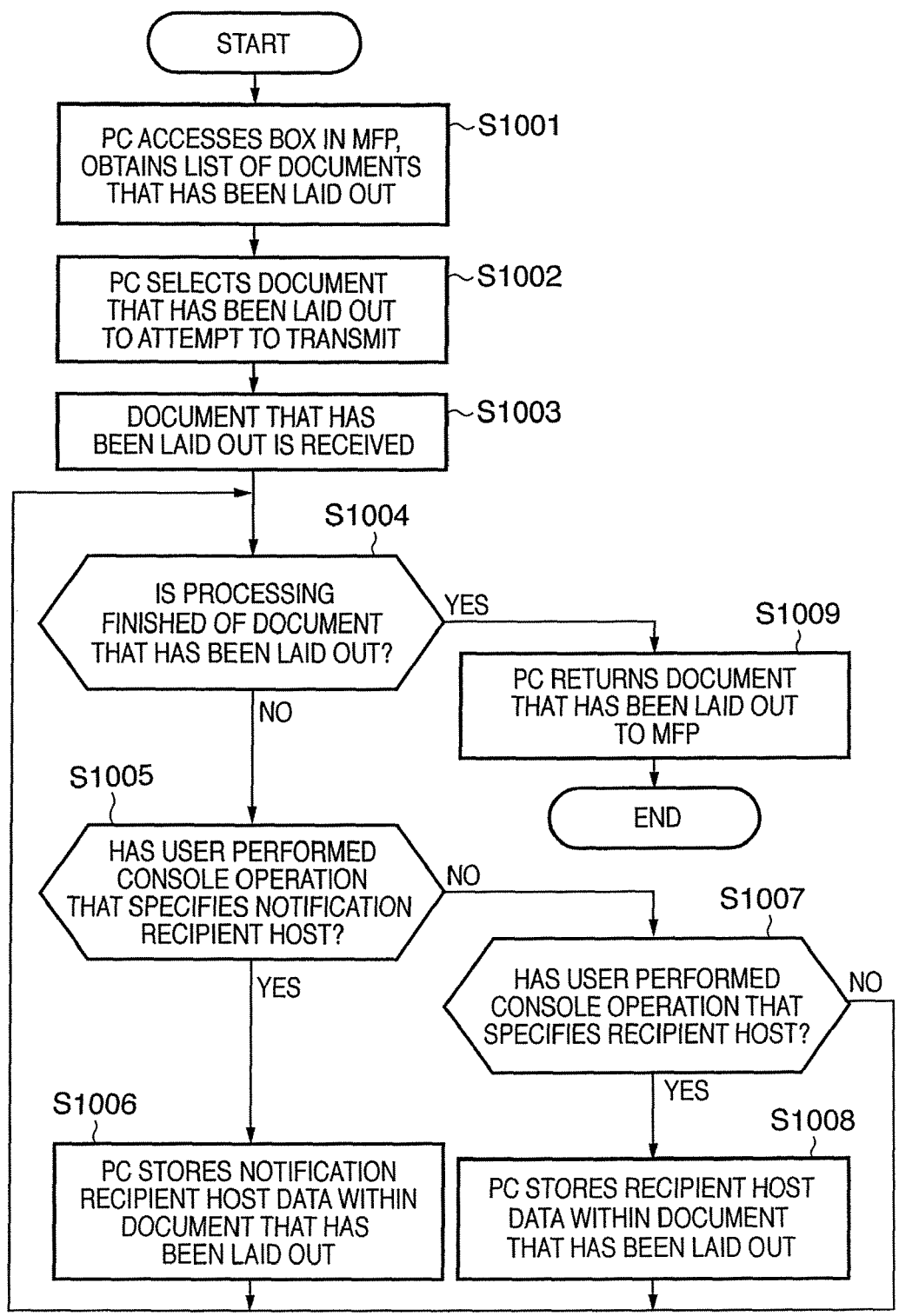
FIG. 9 is a flowchart depicting an example of a process of altering the document that has been laid out within the MFP 101, with regard to a PC 104.
Figure 10:
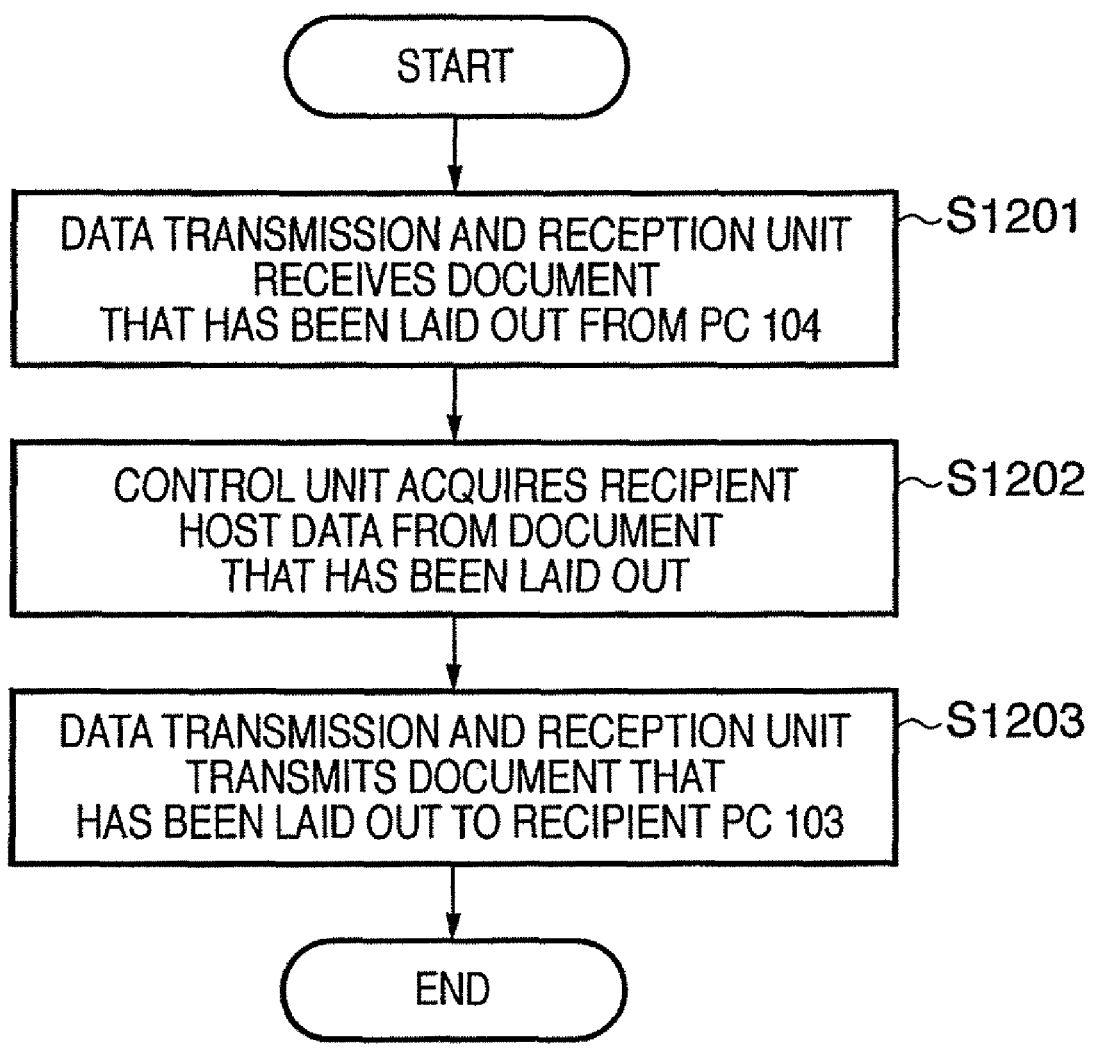
FIG. 10 is a flowchart depicting an example of a process of transmitting the document that has been laid out 110 of the MFP 101.

Following is a description according to a second embodiment, with reference to FIGS. 9-11. It is presumed, for example, that a user A is using the PC 103, and a user B is using the PC 104. Following is a description of an example of a process of altering the document that has been laid out within the MFP 101, with regard to a PC 104, with reference to the flowchart depicted in FIG. 9. FIG. 9 is a flowchart depicting an example of a process of altering the document that has been laid out within the MFP 101.

In FIG. 9, step S1001, the PC 104 accesses the box 109 within the MFP 101, and acquires a list of the document that has been laid out 110 that is stored therein, in response to a console operation on the part of the user.

In step S1002, the PC 104 selects the document that has been laid out 110 to be transmitted from the list, in response to the console operation on the part of the user.

In step S1003, the PC 104 receives the selected document that has been laid out 110 from the MFP 101.

In step S1004, the PC 104 determines whether or not the process of the document that has been laid out is finished, in response to the console operation on the part of the user. If the process is not finished, in step S1005, the PC 104 determines whether or not the user has performed a console operation that specifies a recipient host.

If the user has performed a console operation that specifies the recipient host, in step S1006, the PC 104 stores the host name thereof as a recipient host data within the received document that has been laid out 110. The recipient host data is stored in a reference numeral 810 in FIG. 6. The recipient hostname is thus stored within a <Layout:notified-host> tag. In the example depicted in FIG. 6, "pc2.xyz.com," the hostname of the PC 104, is stored. If no <Layout:notified-host> tag is present in such a circumstance, the PC 10 creates the tag in the present step.

If the user has not performed a console operation that specifies the recipient host, in step S1007, the PC 104 determines whether or not a console operation has been performed that specifies a recipient host.

If the console operation has been performed that specifies the recipient host, in step S1008, the PC 104 stores a recipient host data that the use specifies in the document that has been laid out 110. A recipient hostname is thus stored as a content of a <Layout:destination-host> tag. In the example depicted in FIG. 6, "pc1.xyz.com," the hostname of the PC 103, is stored, with the user of the PC 104 selecting the PC 103 as the recipient.

If the console operation on the part of the user on the document that has been laid out 110 is finished, that is, step S1004 is "YES," in step S1009, the PC 104 returns the document that has been laid out that has been laid out 110 to the MFP 101, and the process depicted in FIG. 9 ends.

Upon receipt of the document that has been laid out 110, the MFP 101 replaces the old document that has been laid out 110 that is in the box 109 with the received document that has been laid out 110 (not shown). The MFP 101 performs a similar process for updating the association table (not shown).

A method has been described according to the embodiment that transmits and receives the document that has been laid out itself between the PC 104 and the MFP 101. In such a circumstance, a locking mechanism of some sort is necessary to avoid another PC updating the document that has been laid out while the PC 104 is storing a data of some sort within the document that has been laid out.

Conversely, it would be permissible to apply a method that does not transmit and receive the document that has been laid out itself. For example, a method wherein the PC 104 sends an information that denotes which document that has been laid out, information of a host that is a recipient of a notification, or information of a host that is a recipient of a document, to the MFP 101. In such a circumstance, the MFP 101 employs the information sent thereto from the PC 104 to store a data of the host that is the recipient of the notification in the document that has been laid out 110.

Following is a description of a process of transmitting the document that has been laid out 110 of the MFP 101, with reference to the flowchart depicted in FIG. 10. FIG. 10 is a flowchart depicting an example of a process of transmitting the document that has been laid out 110 of the MFP 101.

Following the process depicted in FIG. 9, the document that has been laid out 110 wherein the data of the host that is the recipient of the document is stored is sent from the PC 104 to the MFP 101. In step S1201, the data transmission and reception unit 112 of the MFP 101 receives the document that has been laid out 110 from the PC 104.

In step S1202, the control unit 113 acquires data of a host that is a recipient of a document 811 from within the received document that has been laid out 110. Doing so allows understanding the hostname of the recipient, whereupon the data transmission and reception unit 112 transmits the document that has been laid out 110 to the PC 103, which is the host of the recipient, and the process ends.

Figure 11B:
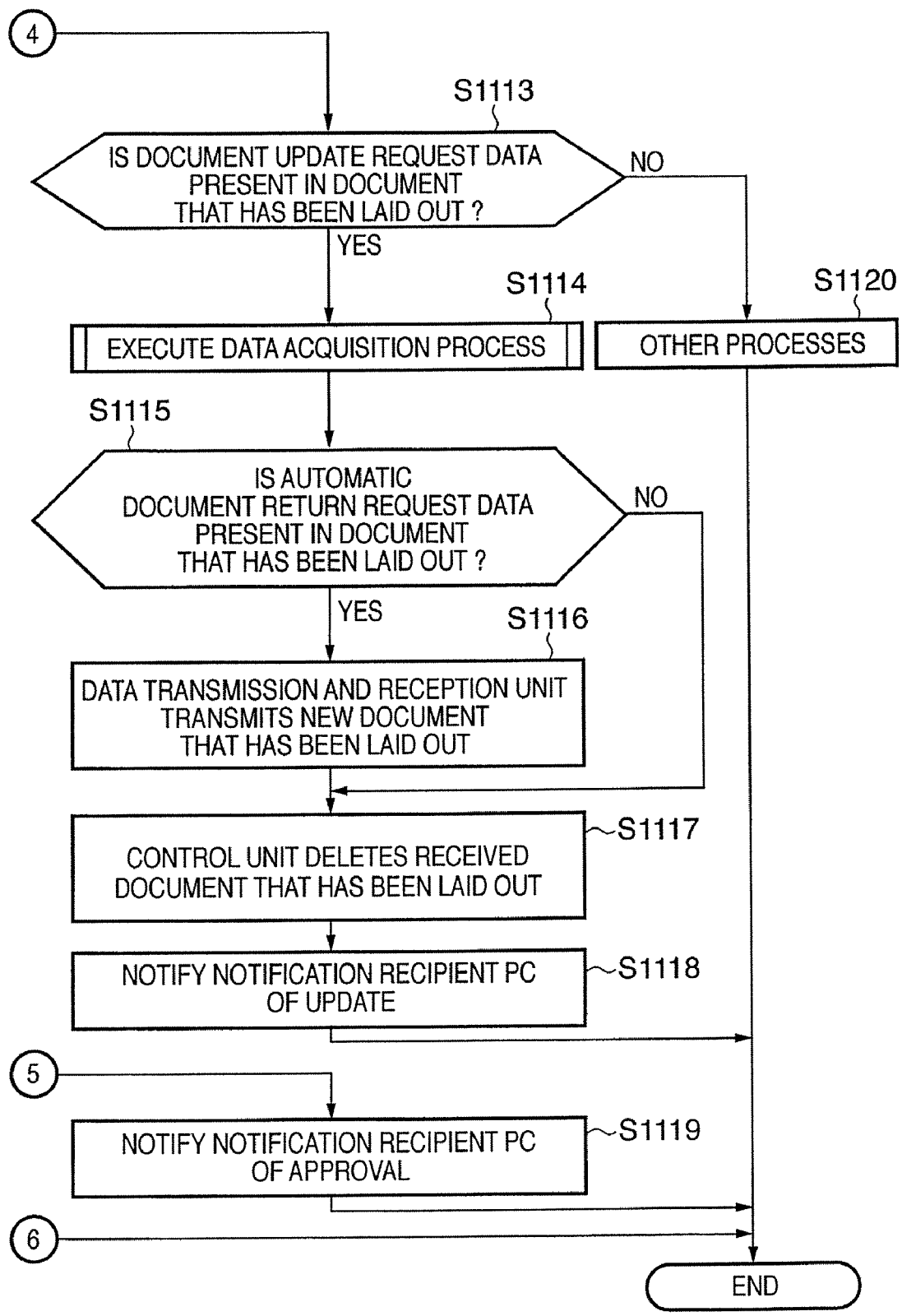

The document that has been laid out 110 that is sent to the PC 103 is processed in a manner similar to the description according to FIG. 7. Following is a description of a process of receiving the document that has been laid out 110 of the MFP 101, with reference to the flowcharts depicted in FIGS. 11A and 11B. FIGS. 11A and 11B are flowcharts depicting an example of a process of receiving the document that has been laid out 110 of the MFP 101.

Following the process depicted in FIG. 7, the document that has been laid out 110 that is processed in the PC 103 is sent to the MFP 101. In step S1101, the data transmission and reception unit 112 of the MFP 101 receives the document that has been laid out 110.

Thereafter, the process in steps S1102-S1111 are similar to the process described in FIG. 8A, steps S701-S711, and a description thereof is thus omitted.

Following step S1111, in step S112, the control unit 113 recognizes the recipient host data that is stored in the document that has been laid out 110, and sends a message to the PC 104 that is the recipient host to the effect that the approval and printing have been executed. If the data of the host that performed the approval or the data of the date of the approval is present within the document that has been laid out 110, it would be possible for the control unit 113 to recognize the information, and embed the information within the message (not shown). Displaying the message on the PC 104 that receives the message will inform the user B of the status of the document that has been laid out 110.

If step S1109 is "NO," the approval is performed even though the print process is not executed, and thus, the control unit 113 sends a message to the PC 104 that is the recipient host to the effect that the approval has been executed.

The process in steps S1113-S1117 are similar to the process described in FIG. 8B, steps S712-S716, and a description thereof is thus omitted.

Following step S1117, the control unit 113 sends a message to the PC 104 that is the recipient host to the effect that the document update has been executed. While FIGS. 11A and 11B do not include in the message whether or not the message is automatically sent to the PC 103, it goes without saying that such inclusion would be permissible.

It would be possible for an apparatus wherein a document that has been laid out is automatically generated to facilitate the generation of the data for output in accordance with an edit of the document that has been laid out or the content of the post-edit document that has been laid out, according to the embodiments.

It would be possible to simplify editing of the editable document that has been laid out, and output the document without changing the existing output process, by associating and maintaining the document and the document to be printed, according to the embodiments. It would be possible to transmit the document that has been laid out to the PC or other apparatus, and edit the document that has been laid out on the PC or other apparatus. It would be possible to embed a processing request in the document that has been laid out when editing, and process the document that has been laid out thereafter, in accordance with the processing request. It would be possible to direct the updating of the document that has been laid out, obtain a data from a server when the update instruction is present, and obtain the document that has been laid out in accordance with the data obtained thereby.

For example, whereas an example has been described according to the first and second embodiments of editing the document that has been laid out 110 primarily on the PC 103 or the PC 104, it would be permissible to edit the document that has been laid out 110 on the MFP 101. For example, it would be permissible for the user B to login to the MFP 101 and process the document that has been laid out 110 after the user A has logged in to the MFP 101 and edited the document that has been laid out 110.

The objective of the present invention is achieved by supplying a storage medium, that is, a recording medium, that records software that implements the functions according to the embodiments, to a system or an apparatus, and a computer, that is, a CPU or an MPU, of the system or the apparatus executing the software. In such a circumstance, the storage medium that stores the software configures the present invention, because the software itself that is read out from the storage medium implements the functions according to the embodiments.

Also included is a circumstance wherein the functions are implemented by the actual processing being performed, in whole or in part, by an operating system or other software running on the computer, in addition to implementing the functions by executing the software.

Also included is a circumstance wherein the functions are implemented by the software being loaded into a memory of an expansion card or unit that is connected to the computer, and a CPU or other component of the card or unit performing the actual processing, in whole or in part.

When the present invention is applied to the storage medium, a software is stored on the storage medium that corresponds to the flowcharts described herein.

It would be possible for an apparatus wherein a document that has been laid out is automatically generated to facilitate the generation of the data for output in accordance with an edit of the document that has been laid out or the content of the post-edit document that has been laid out, according to the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-305716, filed Nov. 10, 2006, which is hereby incorporated by reference herein in its entirety.

What is claimed is:

1. A document processing apparatus, comprising:
    a data acquisition unit configured to acquire data from a server based on data acquisition instruction information read out from a document set including a layout template that describes layout information and the data acquisition instruction information that describes the data to be acquired from the server;
    a generation unit configured to merge the acquired data into the layout template to generate a first document that has been laid out;
    a rendering unit configured to render the first document that has been laid out to obtain a first document for output;
    a document association unit configured to associate the document set, the first document that has been laid out, and the first document for output;
    a transmission unit configured to transmit the first document that has been laid out to a terminal apparatus; and
    a reception unit configured to receive a second document that has been laid out from the terminal apparatus,
    wherein the second document that has been laid out has been generated by editing the first document that has been laid out, and
    wherein, in a case where the second document that has been laid out has been generated by adding a document update request to the first document that has been laid out, the data acquisition unit acquires the data again from the server to update the second document that has been laid out, the rendering unit renders the second document that has been laid out to obtain a second document for output, and the document association unit deletes the first document that has been laid out and the first document for output, and associates the document set, the second document that has been laid out, and the second document for output.

2. A document processing method for an output apparatus, comprising:
    acquiring data from a server based on data acquisition instruction information read out from a document set including a layout template that describes layout information and the data acquisition instruction information that describes the data to be acquired from the server;
    merging the acquired data into the layout template to obtain a first document that has been laid out;
    rendering the first document that has been laid out to obtain a first document for output;
    associating the document set, the first document that has been laid out and the first document for output;
    transmitting the first document that has been laid out to a terminal apparatus; and
    receiving a second document that has been laid out from the terminal apparatus,
    wherein the second document that has been laid out has been generated by editing the first document that has been laid out, and
    wherein, in a case where the second document that has been laid out has been generated by adding a document update request to the first document that has been laid out, the document processing method further comprises:
        acquiring the data again from the server to update the second document that has been laid out;
        rendering the second document that has been laid out to obtain a second document for output;
        deleting the first document that has been laid out and the first document for output; and
        associating the document set, the second document that has been laid out and the second document for output.

3. A program recorded on a non-transitory computer-readable recording medium for causing a computer to execute a document processing method comprising:
    acquiring data from a server based on data acquisition instruction information read out from a document set including a layout template and the data acquisition instruction information;
    merging the acquired data into the layout template to obtain a first document that has been laid out;
    rendering the first document that has been laid out to obtain a first document for output;
    associating the document set, the first document that has been laid out, and the first document for output;
    transmitting the first document that has been laid out to a terminal apparatus; and
    receiving a second document that has been laid out from the terminal apparatus,
    wherein the second document that has been laid out has been generated by editing the first document that has been laid out, and
    wherein, in a case where the second document that has been laid out has been generated by adding a document update request to the first document that has been laid out, the document processing method further comprises:
        acquiring the data again from the server to update the second document that has been laid out;
        rendering the second document that has been laid out to obtain a second document for output;

deleting the first document that has been laid out and the first document for output; and associating the document set, the second document that has been laid out, and the second document for output.

* * * * *